United States Patent
LaBerge et al.

(10) Patent No.: US 11,642,991 B2
(45) Date of Patent: May 9, 2023

(54) VEHICLE SEAT WITH INTEGRAL AIR DUCTING

(71) Applicant: Nikola Corporation, Phoenix, AZ (US)

(72) Inventors: Nicolas LaBerge, Avondale, AZ (US); Kyle Ness, Phoenix, AZ (US)

(73) Assignee: Nikola Corporation, Phoenix, AZ (US)

( * ) Notice: Subject to any disclaimer, the term of this patent is extended or adjusted under 35 U.S.C. 154(b) by 426 days.

(21) Appl. No.: 16/925,497

(22) Filed: Jul. 10, 2020

(65) Prior Publication Data

US 2021/0023970 A1    Jan. 28, 2021

Related U.S. Application Data

(60) Provisional application No. 62/879,270, filed on Jul. 26, 2019.

(51) Int. Cl.
| | | |
|---|---|---|
| *B60N 2/38* | (2006.01) | |
| *B60N 2/56* | (2006.01) | |
| *B60H 1/00* | (2006.01) | |

(52) U.S. Cl.
CPC ....... *B60N 2/5628* (2013.01); *B60H 1/00285* (2013.01); *B60N 2/38* (2013.01)

(58) Field of Classification Search
CPC ...... B60N 2/38; B60N 2/5628; B60H 1/0028; B60H 1/00285
See application file for complete search history.

(56) References Cited

U.S. PATENT DOCUMENTS

| | | | | |
|---|---|---|---|---|
| 5,450,894 A | * | 9/1995 | Inoue | B60H 1/00842 454/907 |
| 5,524,439 A | * | 6/1996 | Gallup | B60H 1/00478 62/3.61 |
| 5,626,021 A | * | 5/1997 | Karunasiri | B60H 1/00285 62/3.61 |
| 10,889,378 B1 | * | 1/2021 | Wilson | B60N 2/5657 |
| 11,167,672 B2 | * | 11/2021 | Hoshi | B60N 2/5657 |
| 2005/0238339 A1 | * | 10/2005 | Bargheer | B60N 2/5628 219/202 |
| 2006/0130490 A1 | * | 6/2006 | Petrovski | B60N 2/5642 62/3.61 |
| 2006/0290176 A1 | * | 12/2006 | Aoki | B60N 2/5628 297/180.13 |
| 2009/0031742 A1 | * | 2/2009 | Seo | B60H 1/00285 297/180.14 |
| 2011/0186560 A1 | * | 8/2011 | Kennedy | B60N 2/5678 219/217 |

(Continued)

FOREIGN PATENT DOCUMENTS

| | | | | | |
|---|---|---|---|---|---|
| CN | 109532593 A | * | 3/2019 | | B60H 1/32 |
| CN | 110087940 A | * | 8/2019 | | B60G 21/05 |

(Continued)

*Primary Examiner* — Rodney B White
(74) *Attorney, Agent, or Firm* — Snell & Wilmer L.L.P.

(57) ABSTRACT

The present disclosure describes vehicle seats having integral components for use with ventilation, air conditioning, and/or heating systems. Air ducting can be incorporated into the seat base and the seat back. Further, air can be directed through a rear-facing outlet vent in the seat back, providing improved ventilation, air conditioning, and/or heating for rear passengers of a vehicle.

17 Claims, 9 Drawing Sheets

(56) References Cited

U.S. PATENT DOCUMENTS

| | | | |
|---|---|---|---|
| 2016/0096460 A1* | 4/2016 | Storgato | B60N 2/5621 |
| | | | 297/180.13 |
| 2016/0144686 A1* | 5/2016 | Fujii | B60N 2/5657 |
| | | | 454/120 |
| 2016/0347218 A1* | 12/2016 | Akaike | B60N 2/5657 |
| 2018/0117987 A1* | 5/2018 | Yamaoka | B60N 2/5657 |
| 2020/0180478 A1* | 6/2020 | Sago | B60N 2/5657 |
| 2020/0198506 A1* | 6/2020 | Longatte | B60N 2/879 |
| 2021/0039476 A1* | 2/2021 | Suzuki | B60N 2/5628 |
| 2021/0039791 A1* | 2/2021 | Wilson | B60N 2/5635 |
| 2021/0102733 A1* | 4/2021 | Stahl | B60N 2/5657 |
| 2021/0276400 A1* | 9/2021 | Niimi | B60H 1/3421 |

FOREIGN PATENT DOCUMENTS

| | | | | | |
|---|---|---|---|---|---|
| CN | 111452688 | A | * | 7/2020 | B60N 2/5628 |
| CN | 111762074 | A | * | 10/2020 | B60N 2/5628 |
| EP | 0411375 | A1 | * | 2/1991 | B60N 2/5628 |
| JP | 11123959 | A | * | 5/1999 | A47C 7/74 |

* cited by examiner

VEHICLE SEAT WITH INTEGRAL AIR DUCTING

CROSS-REFERENCE TO RELATED APPLICATION

This application claims priority to and the benefit of U.S. Provisional Application No. 62/879,270 entitled "Automotive Seat With Integral Air Ducting" filed on Jul. 26, 2019. The foregoing application is hereby incorporated by reference in its entirety (except for any subject matter disclaimers or disavowals, and except to the extent of any conflict with the disclosure of the present application, in which case the disclosure of the present application shall control).

TECHNICAL FIELD

The disclosure relates generally to systems, methods, and devices for vehicle seating, and more particularly, to methods, systems, and devices for vehicle seating with integral air ducting.

BACKGROUND

In conventional vehicles (such as off-road vehicles or automobiles) having multiple rows of seats, air (including air conditioned and/or heated air) can be provided to one or more rear passengers by routing air ducting towards the rear passengers. Air ducting is typically routed through center consoles, along roof interiors (e.g., through headliners), and/or along b-pillars. These conventional systems typically require complex air ducting routing and/or positioning of air outlets in inconvenient or non-ideal positions relative to rear passengers. Further, long and/or complex air ducting routing can create reduced system performance of the vehicle air conditioning and/or heating system due to pressure drop.

Therefore, less complex and/or improved routing of air ducting is desirable. Further, air ducting having outlets positioned above the water wading line may be beneficial in off-road automobiles.

SUMMARY

A vehicle seat may comprise a seat base coupled to a seat back, wherein the seat base comprises a top segment spaced apart from and coupled to a bottom segment, and wherein the seat back comprises a front segment spaced apart from and coupled to a rear segment, a base air conduit positioned within the seat base, wherein a first wall of the base air conduit comprises a portion of an inner surface of one of the top segment and the bottom segment, a back air conduit positioned within the seat back, wherein a first wall of the back air conduit comprises a portion of an inner surface of one of the front segment and the rear segment, an air outlet fluidly coupled to the back air conduit and positioned in the rear segment of the seat back, and an air inlet fluidly coupled to the base air conduit.

In various embodiments, the air inlet may be fluidly coupled to a vehicle air conditioning system. The back air conduit and the base air conduit may be waterproof. The seat base may further comprise two ribs positioned proximate and coupled to the first wall of the base air conduit, and wherein the two ribs may comprise a second wall and a third wall of the base air conduit. The two ribs of the seat base may be coupled to the inner surface of the bottom segment to form a fourth wall of the base air conduit. The seat back may further comprise two ribs positioned proximate and coupled to the first wall of the back air conduit, and wherein the two ribs may comprise a second wall and a third wall of the back air conduit. The two ribs of the seat back may be coupled to the inner surface of the rear segment to form a fourth wall of the back air conduit. The front segment and the rear segment of the seat back and the top segment and the bottom segment of the seat base may comprise a plastic material. A cap segment may be coupled to the two ribs of the seat base to form a fourth wall of the base air conduit. The air outlet of the seat back may be positioned such that air flowing through the air outlet will be directed toward a head of a rear passenger.

A vehicle seat may comprise a seat base coupled to a seat back, wherein the seat base comprises a top segment spaced apart from and coupled to a bottom segment, and wherein the seat back comprises a front segment spaced apart from and coupled to a rear segment, a base air conduit positioned within the seat base, wherein a first wall of the base air conduit comprises an inner surface of the bottom segment, and wherein the base air conduit is substantially waterproof, a pair of base ribs coupled to the inner surface of the bottom segment of the seat base, a back air conduit positioned within the seat back, wherein a first wall of the back air conduit comprises a portion of an inner surface of the rear segment, and wherein the back air conduit is substantially waterproof, a pair of back ribs coupled to the inner surface of the rear segment of the seat back, a waterproof coupling fluidly coupled to the base air conduit and the back air conduit, an air outlet fluidly coupled to the back air conduit and positioned in the rear segment of the seat back, and an air inlet fluidly coupled to the base air conduit.

In various embodiments, the air inlet may be fluidly coupled to a vehicle air conditioning system. The base air conduit may further comprise a fourth wall coupled to the pair of base ribs. The pair of base ribs may be coupled to an inner surface of the top segment of the seat base forming the fourth wall of the base air conduit. The back air conduit may further comprise a fourth wall coupled to the pair of back ribs. The pair of back ribs may be coupled to an inner surface of the front segment of the seat back forming the fourth wall of the back air conduit. The front segment and the rear segment of the seat back and the top segment and the bottom segment of the seat base may comprise a plastic material. The air outlet of the seat back may be positioned such that air flowing through the air outlet will be directed toward a head of a rear passenger.

An off-road vehicle may comprise a floor, a driver seat coupled to the floor, the driver seat comprising, a seat base coupled to a seat back, wherein the seat base comprises a top segment spaced apart from and coupled to a bottom segment, and wherein the seat back comprises a front segment spaced apart from and coupled to a rear segment, a base air conduit positioned within the seat base, wherein a first wall of the base air conduit comprises a portion of an inner surface of one of the top segment and the bottom segment, and wherein the base air conduit is substantially waterproof, a back air conduit positioned within the seat back, wherein a first wall of the back air conduit comprises a portion of an inner surface of one of the front segment and the rear segment, and wherein the back air conduit is substantially waterproof, a waterproof coupling fluidly coupled to the base air conduit and the back air conduit, an air outlet fluidly coupled to the back air conduit and positioned in the rear segment of the seat back, an air inlet fluidly coupled to the base air conduit, and a rear seat coupled to the floor and positioned behind the driver seat.

In various embodiments, the off-road vehicle may further comprise a passenger seat coupled to the floor, and a second rear seat coupled to the floor and positioned behind the passenger seat.

The foregoing features and elements may be combined in any combination, without exclusivity, unless expressly indicated herein otherwise. These features and elements as well as the operation of the disclosed embodiments will become more apparent in light of the following description and accompanying drawings. The contents of this section are intended as a simplified introduction to the disclosure and are not intended to be used to limit the scope of any claim.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
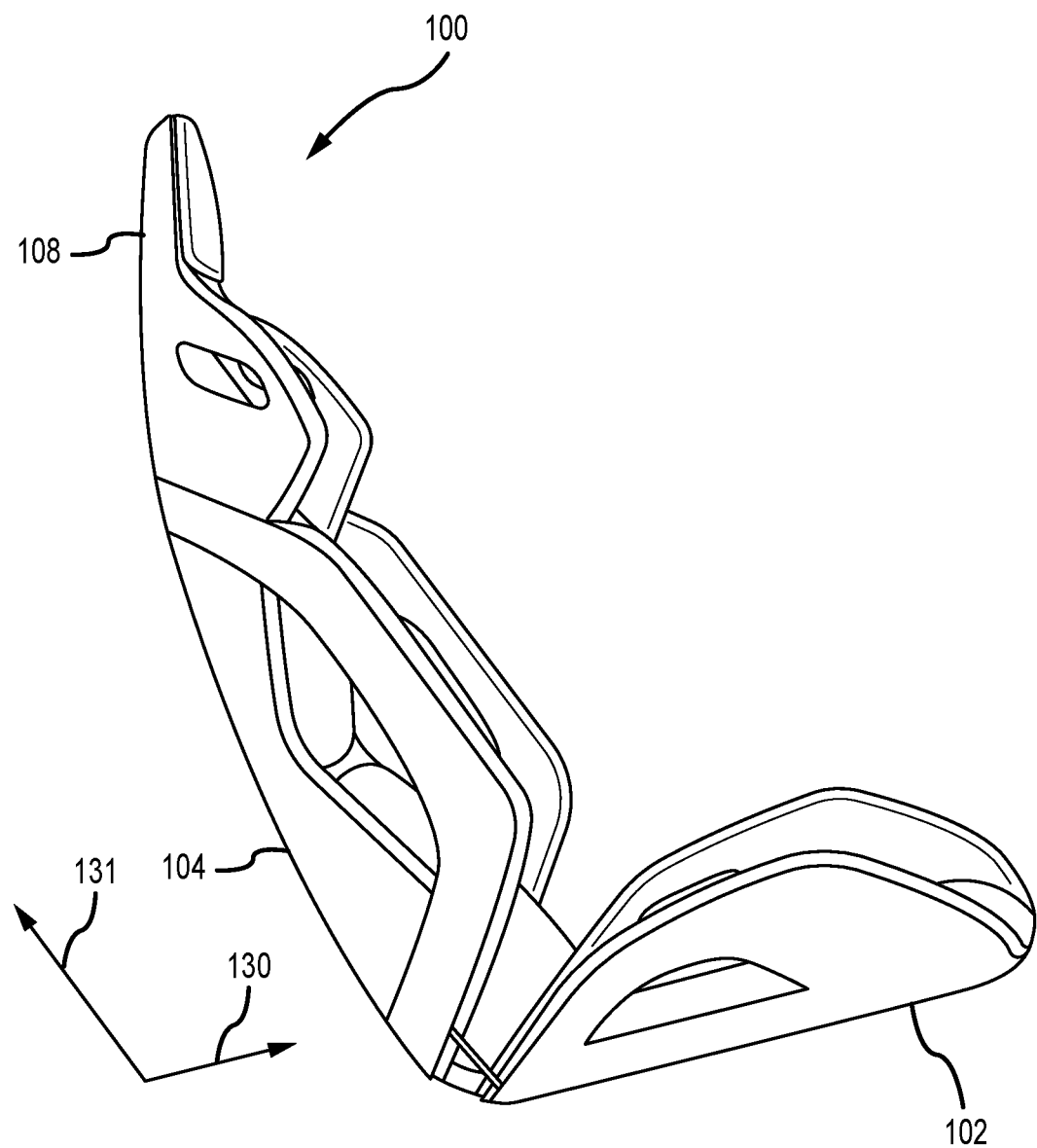
FIG. 1 is a perspective view of a vehicle seat, in accordance with the present disclosure.
Figure 2:
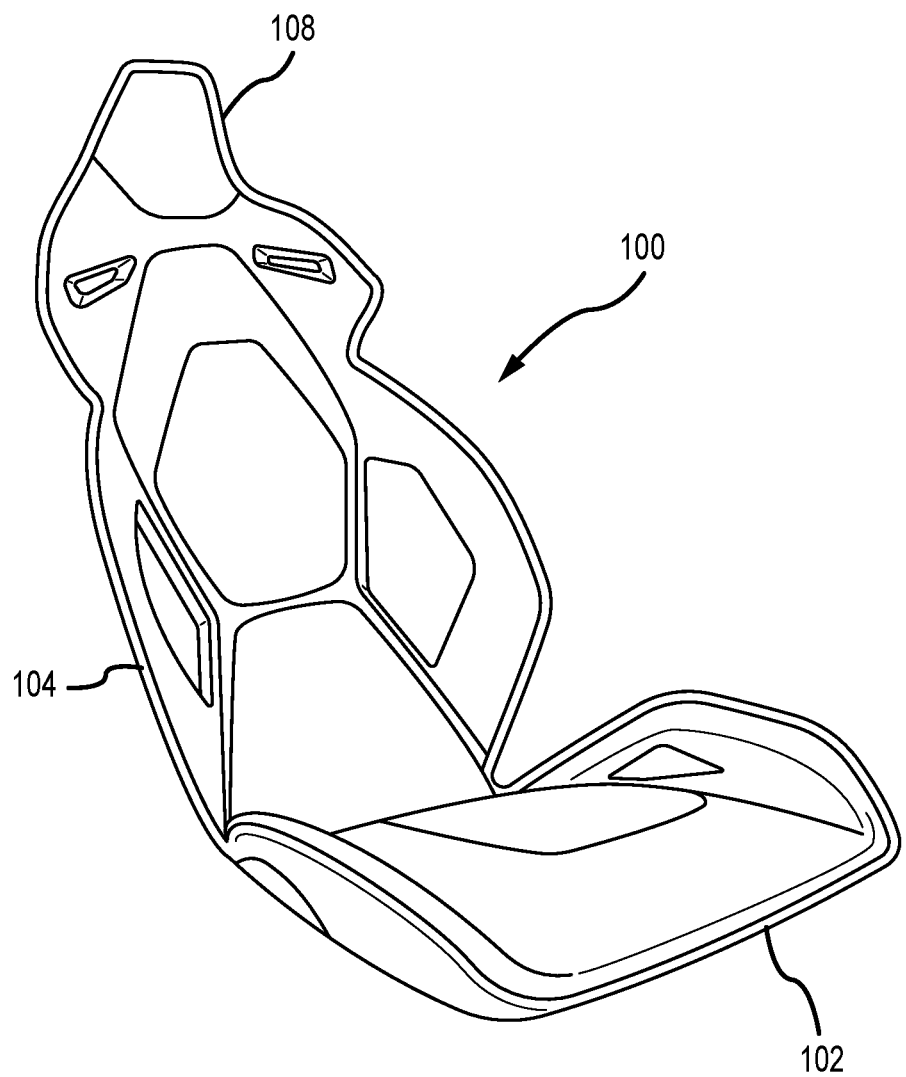
FIG. 2 is another perspective view of a vehicle seat, in accordance with the present disclosure.
Figure 3:
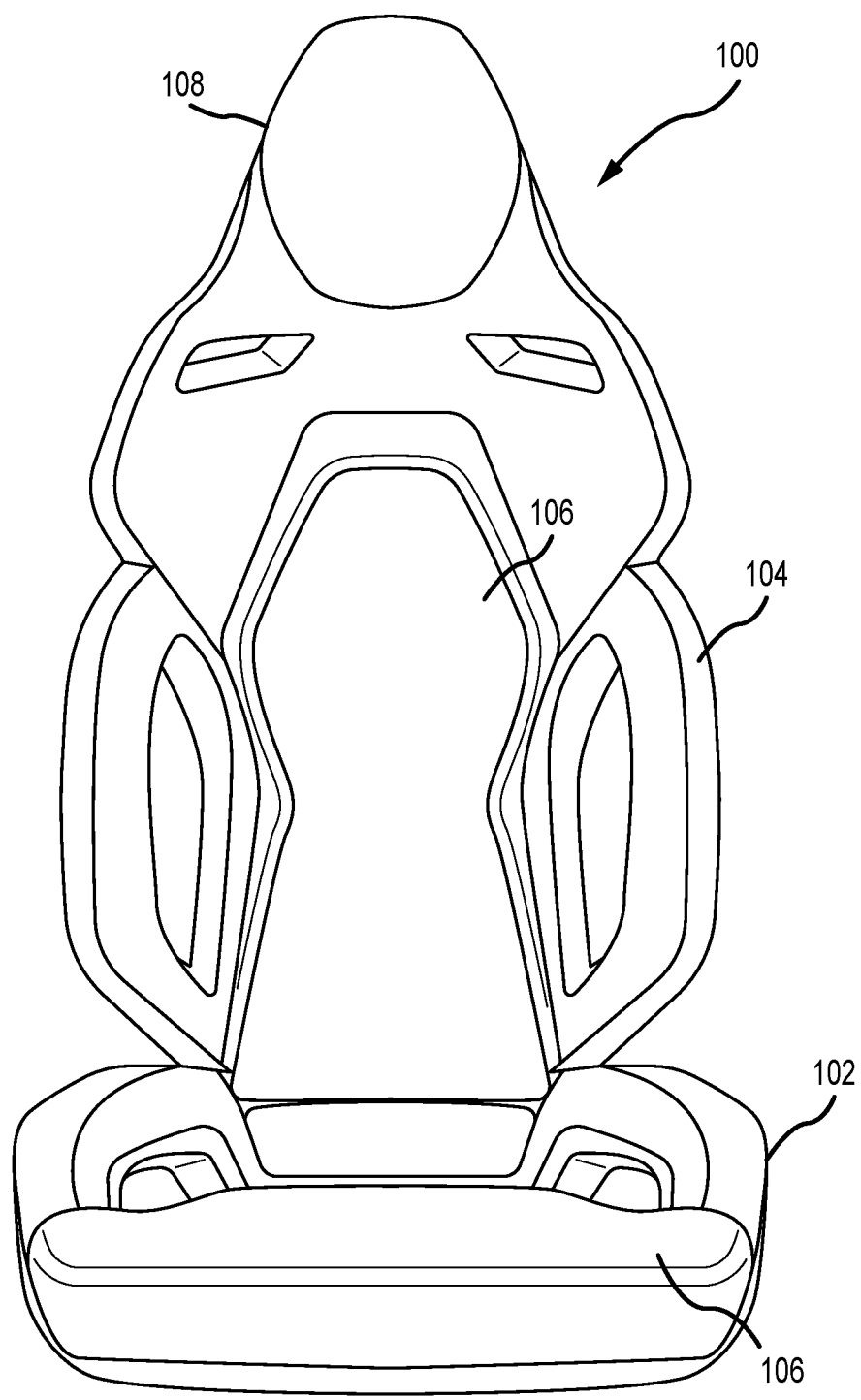
FIG. 3 is a front view of a vehicle seat, in accordance with the present disclosure.

For purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of the disclosure, are to be considered within the scope of the disclosure.

It is to be understood that this disclosure is not limited to the particular configurations, process steps, and materials disclosed herein as such configurations, process steps, and materials may vary. It is also to be understood that the terminology employed herein is used for the purpose of describing particular embodiments only and is not intended to be limiting. In describing the principles of the present disclosure, the following terminology will be used in accordance with the definitions set out below. It must be noted that, as used in this specification and the appended claims, the singular forms "a," "an," and "the" include plural referents unless the context clearly dictates otherwise. As used herein, the terms "comprising," "including," "containing," "characterized by," and grammatical equivalents thereof are inclusive or open-ended terms that do not exclude additional, unrecited elements or method steps.

Vehicle seats in accordance with the present disclosure may provide improved performance of ventilation, air conditioning, and/or heating systems, for example within automobiles. Benefits of vehicle seats having integrated ventilation ducting may include reduced cost and reduced complexity (e.g., fewer individual components as compared to traditional seats) when compared to conventional combination seat and ventilation, air conditioning, and/or heating systems.

With initial reference to FIGS. 1-4, a vehicle seat 100 in accordance with the present disclosure is illustrated. Seat 100 is suitable for use with any automobile, including an off-road vehicle. Seat 100 comprises a seat base 102 and a seat back 104. Seat base 102 comprises the bottom portion of seat 100, onto which a passenger sits. Seat back 104 comprises a relatively upright portion of seat 100 (e.g., seat back 104 may be perpendicular to, and/or create an angle of 90 degrees (more generally, between about 80 degrees and about 130 degrees) with, seat base 102), against which a passenger rests as they sit on seat base 102. In various embodiments, seat base 102 and seat back 104 are positioned relative to each other to form a continuous or semi-continuous (e.g., having a space between seat base 102 and seat back 104) seating surface to provide suitable support and comfort for a passenger.

Seat base 102 and seat back 104 can, for example, be coupled together. In various embodiments, seat base 102 and seat back 104 are statically coupled together at one or more points, such that seat 100 is a fixed-type seat. In other embodiments, seat base 102 and seat back 104 are coupled to each other via a folding or hinging mechanism, such that seat 100 is a folding-type seat (stated another way, the angular relationship between seat base 102 and seat back 104 may be adjustable and or variable within a range, for example in an incremental and/or continuous manner).

In various embodiments, components of seat 100 can include one or more cushion segments 106. For example, each of seat base 102 and/or seat back 104 can include one or more cushion segments 106 to provide additional comfort for a passenger.

Seat 100 can further comprise a headrest 108. Headrest 108 can be positioned at a higher vertical position relative to seat back 104 (for example, along axis 131). In various embodiments, headrest 108 is separated from and coupled to seat back 104. In other embodiments, headrest 108 is integral to seat back 104. Further, headrest 108 may be fixedly coupled to seat back 104 or moveably or removably coupled to seat back 104 (e.g., an adjustable headrest).

Figure 5A:
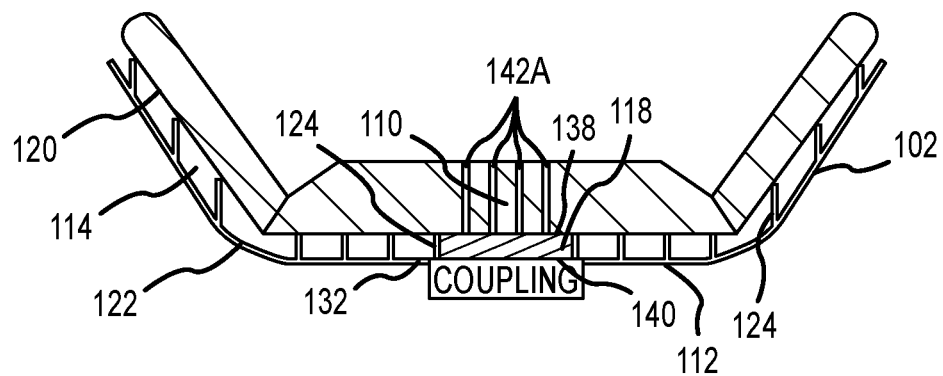
FIG. 5A is a cutaway view of a base of a vehicle seat, in accordance with the present disclosure.
Figure 5B:
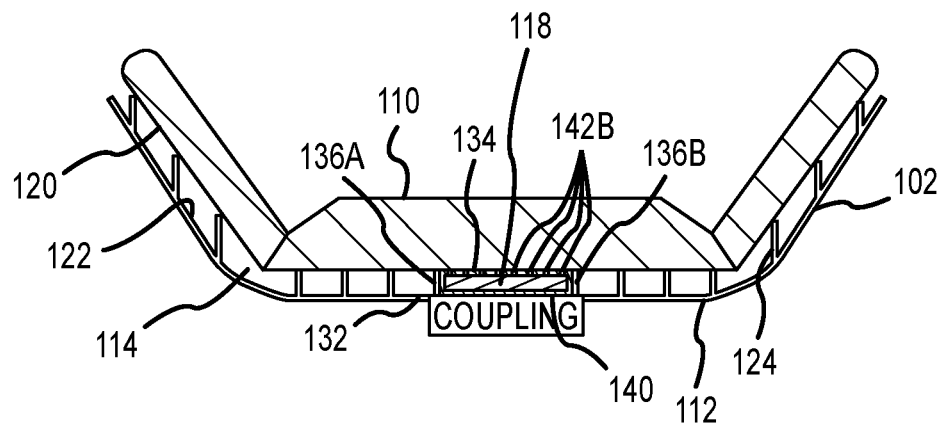
FIG. 5B is a cutaway view of another base of a vehicle seat, in accordance with the present disclosure.
Figure 5C:
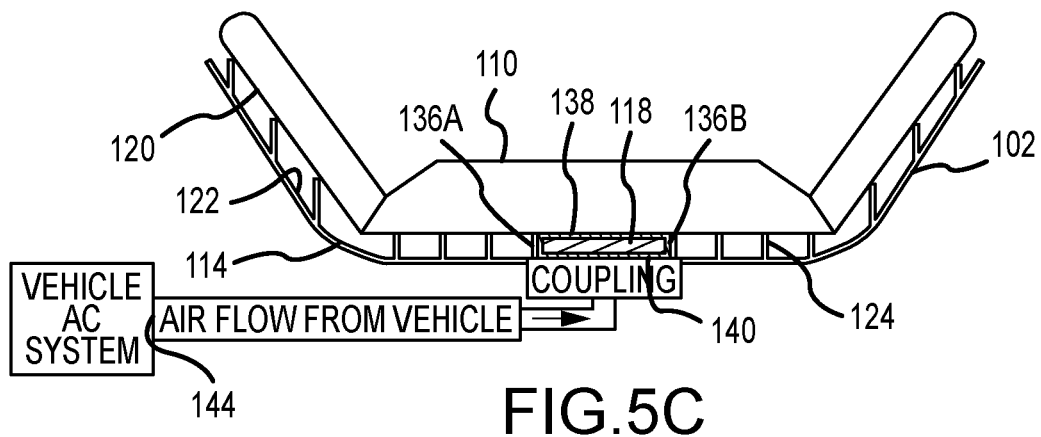
FIG. 5C is a cutaway view of yet another base of a vehicle seat, in accordance with the present disclosure.

In various embodiments, with additional reference to FIGS. 5A-5C, seat base 102 can comprise a top segment 110 and a bottom segment 112 separated from each other, forming an interior volume 114. For example, bottom segment 112 can comprise an inner surface 122 separated from and positioned generally opposite an inner surface 120 of top segment 110.

In various embodiments, top segment 110 comprises a seating surface configured to provide comfort and support for a passenger of a vehicle containing seat 100. For example, top segment 110 can comprise a foam or cushion, among other suitable materials. Top segment 110 can be shaped ergonomically to provide support, comfort, and/or healthy posture to a passenger of the vehicle. In various embodiments, top segment 110 can comprise a single, unitary seating surface. In other embodiments, top segment 110 comprises a seating surface (such as a foam surface) proximate and/or affixed to a reinforcing section, such as a plastic or metal section, which provides additional structure, rigidity, and/or other physical characteristics to top segment 110. Stated another way, top segment 110 can comprise only a foam or cushion segment, or one or more foam or cushion segments with integrated support structure.

Seat base 102 can further comprise one or more structural elements 124 positioned within interior volume 114. For example, structural elements 124 may improve the rigidity, strength, durability, and/or other physical characteristics of seat base 102. In various embodiments, structural elements 124 can be affixed, coupled, or integrally formed into at least one of top segment 110 and bottom segment 112. For example, structural elements 124 can comprise ribs that are formed into either or both of top segment 110 and bottom segment 112. Structural elements 124 may be disposed substantially perpendicularly to, and may span at least a portion of interior volume 114 between, top segment 110 and bottom segment 112. In various embodiments, structural elements 124 may have a length spanning generally parallel to an axis 130 of seat base 102. In various embodiments, structural elements 124 may span generally perpendicular to axis 130 of seat base 102. As used in this context, "generally" means plus or minus 30 degrees from parallel or perpendicular, as appropriate. In various embodiments, structural elements 124 may be disposed in any suitable arrangement or configuration.

Seat base 102 can further comprise a base air conduit 118 positioned between top segment 110 and bottom segment 112, for example, within inner volume 114. In various embodiments, base air conduit 118 comprises a substantially waterproof conduit through which air, including conditioned air (e.g., filtered air, cooled air, and/or heated air) can travel. Base air conduit 118 can, for example, be substantially parallel to axis 130 (as used in this context, "substantially" means plus or minus 30 degrees from parallel). In various embodiments, base air conduct 118 may be linear or non-linear.

In various embodiments, base air conduit 118 comprises a first wall 132 that may be integral to a surface of bottom segment 112 and/or top segment 110. For example, first wall 132 of base air conduit 118 can comprise a portion of inner surface 122 of bottom segment 112 and/or a portion of inner surface 120 of top segment 110. Stated another way, first wall 132 of base air conduit 118 can be a surface already present in one of bottom segment 112 or top segment 110, thereby requiring no additional structure.

Base air conduit 118 can further comprise a cap segment 134. For example, cap segment 134 can be positioned substantially parallel to and proximate first wall 132. In various embodiments, cap segment 134 is coupled to first wall 132 to create a flow channel. Stated another way, first wall 132 and cap segment 134 can combine to form base air conduit 118. Further, cap segment 134 may improve a physical characteristic of seat base 102, such as rigidity, strength, and/or durability.

Figure 9A:
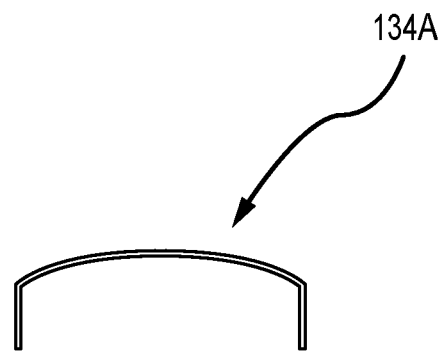
FIG. 9A is a cross sectional view of an air conduit, in accordance with the present disclosure.
Figure 9B:
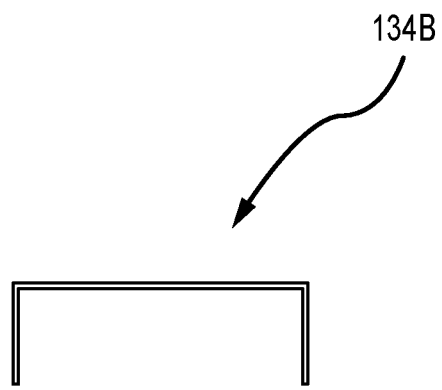
FIG. 9B is a cross sectional view of another air conduit, in accordance with the present disclosure.

With additional reference to FIG. 9A, in various embodiments, cap segment 134A (which may be incorporated similarly to cap segment 134 in FIG. 5B) can comprise a partially rounded cross-sectional profile. Such a structure may increase the cross-sectional area associated with base air conduit 118 thereby allowing a greater volume of air to flow through base air conduit 118 and/or increase rigidity, strength, and/or durability of base air conduit 118. For example, a rounded cap segment 134 can be coupled to first wall 132, forming a base air conduit 118 having a partially rounded, or "D"-shaped profile. With reference to FIG. 9B, cap segment 134B (which may be incorporated similarly to cap segment 134 in FIG. 5B) can comprise a rectangular cross-sectional profile. Such a structure may allow for a compact configuration of base air conduit 118. For example, a cap segment 134 comprising three sides substantially orthogonal to each other can be coupled to first wall 132, forming a base air conduit 118 having a rectangular profile.

Cap segment 134 can comprise any suitable material. In various embodiments, cap segment 134 can comprise a plastic material, such as a molded plastic. For example, cap segment 134 can comprise the same material as seat base 102. Although described with reference to specific materials, cap segment 134 can comprise any suitable material capable of being coupled to first wall 132 to form base air conduit 118.

In other embodiments, cap segment 134 can comprise a channel, such as a channel having a rectangular, square, round, ovoid, triangular, hexagonal, or partially round cross-sectional shape, or any other suitable cross-sectional shape, or other tubular channel. For example, cap segment 134 can comprise a tubular channel positioned between and substantially parallel to two ribs (e.g., structural elements 124), forming base air conduit 118. In various embodiments, a tubular cap segment 134 may provide additional strength, rigidity, and/or other improved physical characteristics to seat base 102. Tubular cap segment 134 can comprise a metal material, such as steel or aluminum. For example, tubular cap segment 134 can comprise an extruded metal, such as an extruded aluminum. Although described with reference to specific materials, tubular cap segment 134 can comprise any suitable durable material.

In various embodiments, cap segment 134 is coupled to first wall 132 to form a substantially waterproof base air conduit 118. For example, seat 100 may be used in an off-road vehicle, including a utility task vehicle, in environments in which water may enter the cab of the vehicle. By providing a substantially waterproof base air conduit 118, the risk of water entering the ventilation, air conditioning, and/or heating system of the vehicle is reduced. For example, cap segment 134 can be affixed to first wall 132 using a water-resistant adhesive. In other embodiments, cap segment 134 can be physically coupled to first wall 132, and the junction between the two components can be sealed using a water-resistant seal or sealant (e.g., a silicone-based sealant). Although described with reference to specific methods of coupling cap segment 134 and first wall 132, any manner of coupling first wall 132 and cap segment 134 is within the scope of the present disclosure, regardless of whether the coupling is substantially waterproof.

With continued reference to FIGS. 5A-5C, in various embodiments, a second wall 136A and a third wall 136B of base air conduit 118 can comprise one or more structural elements 124. For example, base air conduit 118 can comprise a first wall 132, which may comprise a portion of inner surface 122 of bottom segment 112 and/or a portion of inner surface 120 of top segment 110, second wall 136A, and third wall 136B, which may be structural elements 124. In various embodiments, base air conduit 118 comprises first wall 132 positioned between two structural elements 124 to form an open rectangular channel. As previously described, structural elements 124 can comprise ribs or fins integral to an inner surface (i.e., inner surfaces 120, 122) of seat base 102. Stated another way, base air conduit 118 can comprise a structure integral to seat base 102.

For example, as illustrated in FIG. 5B, base air conduit 118 can comprise first wall 132 (which is a portion of inner surface 122), second wall 136A and third wall 136B (which may be formed by, or separate components from, structural elements 124), and a cap segment 134 coupled to the second wall 136A and third wall 136B.

In various embodiments, instead of cap segment 134, base air conduit 118 comprises a fourth wall 138 integral to an inner surface of a component of seat base 102. For example, fourth wall 138 can comprise one of (i) a portion of inner surface 122 of bottom segment 112 or (ii) a portion of inner surface 120 of top segment 110. In such embodiments, fourth wall 138 is opposed to a first wall 132 that is integral to an inner surface of another component of seat base 102, such that both first wall 132 and fourth wall 138 are integral to inner surfaces 120 and 122 of top segment 110 and bottom segment 112, respectively. Stated another way, in various embodiments, base air conduit 118 is defined by two structural elements 124, a portion of inner surface 122, and a portion of inner surface 120.

Base air conduit 118 can be coupled to and in fluid communication with an air inlet 140. For example, air inlet 140 can provide air from an air conditioning, heating, and/or ventilation system of a vehicle to pass through base air conduit 118. In various embodiments, air inlet 140 and base air conduit 118 are coupled in a water-resistant or waterproof manner.

In various embodiments, air inlet 140 is positioned on base air conduit 118 at a point along bottom segment 112 of seat base 102. For example, air inlet 140 can comprise an opening in bottom segment 112 that is in fluid communication with base air conduit 118. In various embodiments, air inlet 140 couples to a vehicle air conditioning system outlet 144 to transmit air from the ventilation, air conditioning, and/or heating system of a vehicle to base air conduit 118. Vehicle air conditioning system outlet 144 can comprise and/or utilize, for example, a flexible ducting which allows for relative movement of seat 100 within a vehicle without disconnecting from vehicle air conditioning system outlet 144.

For example, base air conduit 118 can be configured to provide cooling, heating, and/or ventilation to a passenger sitting in seat 100. In various embodiments, base air conduit 118 can comprise a plurality of holes 142 in first wall 132 and/or fourth wall 138. For example, first wall 132 or fourth wall 138 can be integral to top segment 110 and holes 142 (including, for example, holes 142A in FIG. 5A and/or holes 142B in FIG. 5B) can traverse at least a portion of top segment 110, allowing air to pass from air inlet 140, through holes 142 in seat base 102, and to the passenger in seat 100. In various embodiments and with momentary reference to FIG. 5C, first wall 132 and/or fourth wall 138 may be devoid of holes (for example, holes similar to holes 142A and 142B) in order to maximize the amount of conditioned air available to be routed to other portions of seat 100 and/or the associated vehicle.

Figure 6A:
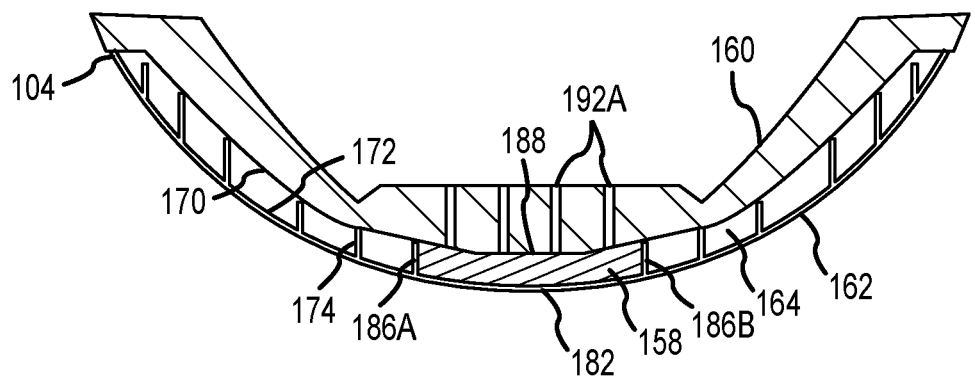
FIG. 6A is a cutaway view of a back of a vehicle seat, in accordance with the present disclosure.
Figure 6B:
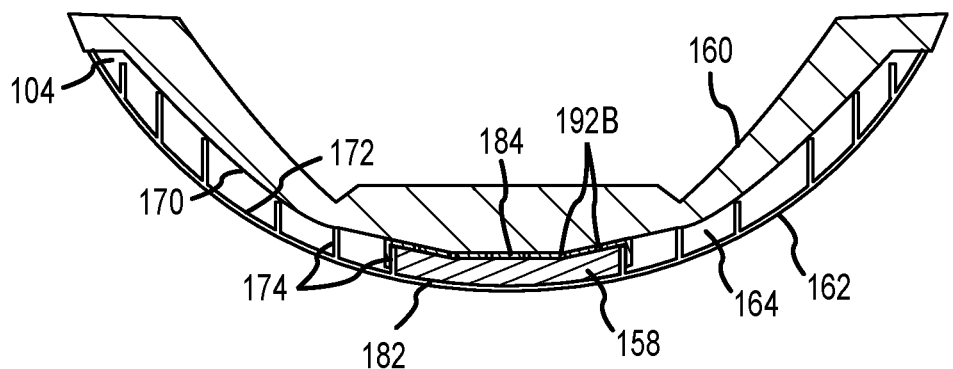
FIG. 6B is a cutaway view of another back of a vehicle seat, in accordance with the present disclosure.
Figure 6C:
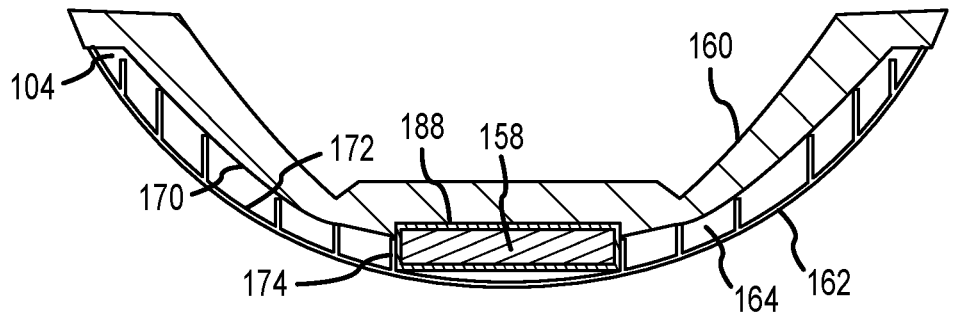
FIG. 6C is a cutaway view of yet another back of a vehicle seat, in accordance with the present disclosure.

With reference now to FIGS. 6A-6C, in various embodiments, seat back 104 may comprise a back air conduit 158. Similar to base air conduit 118, back air conduit 158 can comprise a substantially waterproof conduit through which air, including conditioned air (e.g., filtered air, cooled air, and/or heated air), can travel. For example, back air conduit 158 can span substantially parallel to an axis 131 (with momentary reference to FIG. 1). As used in this context, "substantially" means plus or minus thirty degrees from parallel. In various embodiments, back air conduct 158 may be linear or non-linear.

In various embodiments, seat back 104 comprises a front segment 160 and a rear segment 162 separated from each other, forming an interior volume 164. For example, rear segment 162 can comprise an inner surface 172 separated from and positioned generally opposite an inner surface 170 of front segment 160.

In various embodiments, front segment 160 comprises a seat back surface configured to provide comfort and support for a passenger of the vehicle. For example, front segment 160 can comprise a foam or cushion, among other suitable materials. Front segment 160 can be shaped ergonomically to provide support, comfort, and/or healthy posture to a passenger of the vehicle. In various embodiments, front segment 160 can comprise a single, unitary seat back surface. In other embodiments, front segment 160 comprises a seat back surface (such as a foam surface) proximate and/or affixed to a reinforcing section, such as a plastic or metal section which provides additional structure, rigidity, and/or other physical characteristics to front segment 160. Stated another way, front segment 160 can comprise only a foam or cushion segment, or one or more foam or cushion segments on a rigid or semi-rigid seat back.

Seat back 104 can further comprise one or more structural elements 174 positioned within interior volume 164. For example, structural elements 174 can improve the rigidity, strength, durability, and/or other physical characteristics of seat back 104.

In various embodiments, structural elements 174 can be affixed, coupled, or integrally formed into at least one of front segment 160 and rear segment 162. For example, structural elements 174 can comprise perpendicular ribs that are formed into either or both of front segment 160 and rear segment 162. Structural elements 174 may be disposed substantially perpendicularly to, and may span at least a portion of interior volume 164 between, front segment 160 and rear segment 162. In various embodiments, structural elements 174 may have a length spanning generally parallel to axis 131 (with momentary reference to FIG. 1). In various embodiments, structural elements 174 may span generally perpendicular to axis 131 of seat back 104. As used in this context, "generally" means plus or minus 30 degrees from parallel or perpendicular, as appropriate. In various embodiments, structural elements 174 may be disposed in any suitable arrangement or configuration.

Back air conduit 158 can, for example, be positioned between front segment 160 and rear segment 162, for example, within interior volume 164.

In various embodiments, a first wall 182 of back air conduit 158 may be integral to a surface of rear segment 162 or front segment 160. For example, first wall 182 of back air conduit 158 can comprise a portion of inner surface 172 of rear segment 162 and/or a portion of inner surface 170 of front segment 160. Stated another way, first wall 182 of back air conduit 158 can be a surface already present in one of rear segment 162 or front segment 160, thereby requiring no additional structure.

Back air conduit 158 can further comprise a cap segment 184. For example, cap segment 184 can be positioned substantially parallel to and proximate first wall 182. In various embodiments, cap segment 184 is coupled to first wall 182 to create a flow channel. Stated another way, first wall 182 and cap segment 184 can combine to form back air conduit 158.

Similar to cap segment 134, in various embodiments, cap segment 184 comprises and/or is configured with a partially rounded cross-sectional profile (similar to cap segment 134A in FIG. 9A), which may be incorporated similarly to cap segment 184 in FIG. 6B. Such a structure may increase the cross-sectional area associated with back air conduit 158 thereby allowing a greater volume of air to flow through back air conduit 158 and/or increase rigidity, strength, and/or durability of base air conduit 118. For example, a rounded cap segment 184 can be coupled to first wall 182, forming a back air conduit 158 having a partially rounded, or "D"-shaped profile. In various embodiments, cap segment 184 can comprise or be configured with a rectangular cross-sectional profile (similar to cap segment 134B in FIG. 9B), which may be incorporated similarly to cap segment 184 in FIG. 6B. Such a structure may allow for a compact configuration of base air conduit 118. For example, a cap segment 184 comprising three sides substantially orthogonal to each other can be coupled to first wall 182, forming a back air conduit 158 having a rectangular profile.

In various embodiments, cap segment 184 comprises a channel, such as a channel having a rectangular, square, round, ovoid, hexagonal, or partially round cross-sectional shape, or any other suitable cross-sectional shape, or other tubular channel. For example, cap segment 184 can comprise or be configured with a tubular channel positioned between and substantially parallel to two ribs (e.g., structural elements 174), forming back air conduit 158. In various embodiments, a tubular cap segment 184 may provide additional strength, rigidity, and/or other improved physical characteristics to seat back 104. Tubular cap segment 184 can comprise a metal material, such as steel or aluminum. For example, tubular cap segment 184 can comprise an extruded metal, such as an extruded aluminum. Although described with reference to specific materials, tubular cap segment 184 can comprise any suitable durable material, for example, that is capable of being coupled to first wall 182 to form back air conduit 158.

In various embodiments, cap segment 184 is coupled to first wall 182 to form a substantially waterproof back air conduit 158. Cap segment 184 can, for example, be affixed to first wall 182 using a water-resistant adhesive. In other embodiments, cap segment 184 can be coupled to first wall 182, and the junction between the two components can be sealed using a water-resistant sealer (e.g., a silicone-based sealant). Although described with reference to specific methods of coupling cap segment 184 and first wall 182, any manner of coupling first wall 182 and cap segment 184 is within the scope of the present disclosure.

With continued reference to FIGS. 6A-6C, in various embodiments, a second wall 186A and a third wall 186B of back air conduit 158 can comprise one or more structural elements 174. For example, back air conduit 158 can comprise first wall 182 (which may comprise a portion of inner surface 172 of rear segment 162 and/or a portion of inner surface 170 of front segment 160), second wall 186A, and third wall 186B (which may be structural elements 174). In various embodiments, back air conduit 158 comprises first wall 182 positioned between two structural elements 174 to form a rectangular channel. As previously described, structural elements 174 can comprise ribs or fins integral to an inner surface (i.e., inner surfaces 170, 172) of seat back 104. Stated another way, back air conduit 158 may comprise a structure integral to at least one segment (e.g., front segment 160 and/or rear segment 162) of seat back 104.

In various embodiments, back air conduit 158 comprises a fourth wall 188 integral to an inner surface of a component of seat back 104. For example, with reference to FIG. 6A, fourth wall 188 can comprise one of a portion of inner surface 172 of rear segment 162 or a portion of inner surface 170 of front segment 160. In such embodiments, fourth wall 188 is opposed to a first wall 182 that is integral to an inner surface of another component of seat back 104, such that both first wall 182 and fourth wall 188 are integral to inner surfaces 170 and 172. Stated another way, in various embodiments, back air conduit 158 is defined by two structural elements 174, a portion of inner surface 170, and a portion of inner surface 172.

For example, back air conduit 158 can be configured to provide cooling, heating, and/or ventilation to a passenger sitting in seat 100. In various embodiments, back air conduit 158 can comprise a plurality of holes 192 in first wall 182 and/or fourth wall 188. For example, first wall 182 or fourth wall 188 can be integral to front segment 160 and holes 192 (including, for example, holes 192A in FIG. 6A and/or holes 192B in FIG. 6B) can traverse at least a portion of front segment 160, allowing air to pass from inside back air conduit 158, through holes 192 in seat back 104, and to the passenger in seat 100. In various embodiments and with momentary reference to FIG. 6C, first wall 182 and/or fourth wall 188 may be devoid of holes (for example, holes similar to holes 192A and 192B) in order to maximize the amount of conditioned air available to be routed to other portions of seat 100 and/or the associated vehicle.

Back air conduit 158 can be coupled to base air conduit 118 to form a continuous conduit within seat 100. For example, air from an air conditioning, heating, and/or ventilation system of the vehicle can pass through air inlet 140, continue through base air conduit 118, and enter back air conduit 158. In various embodiments, back air conduit 158 and base air conduit 118 are coupled in a water-resistant or waterproof manner (i.e., back air conduit 158 and base air conduit 118 may be coupled by a waterproof coupling).

Figure 4:
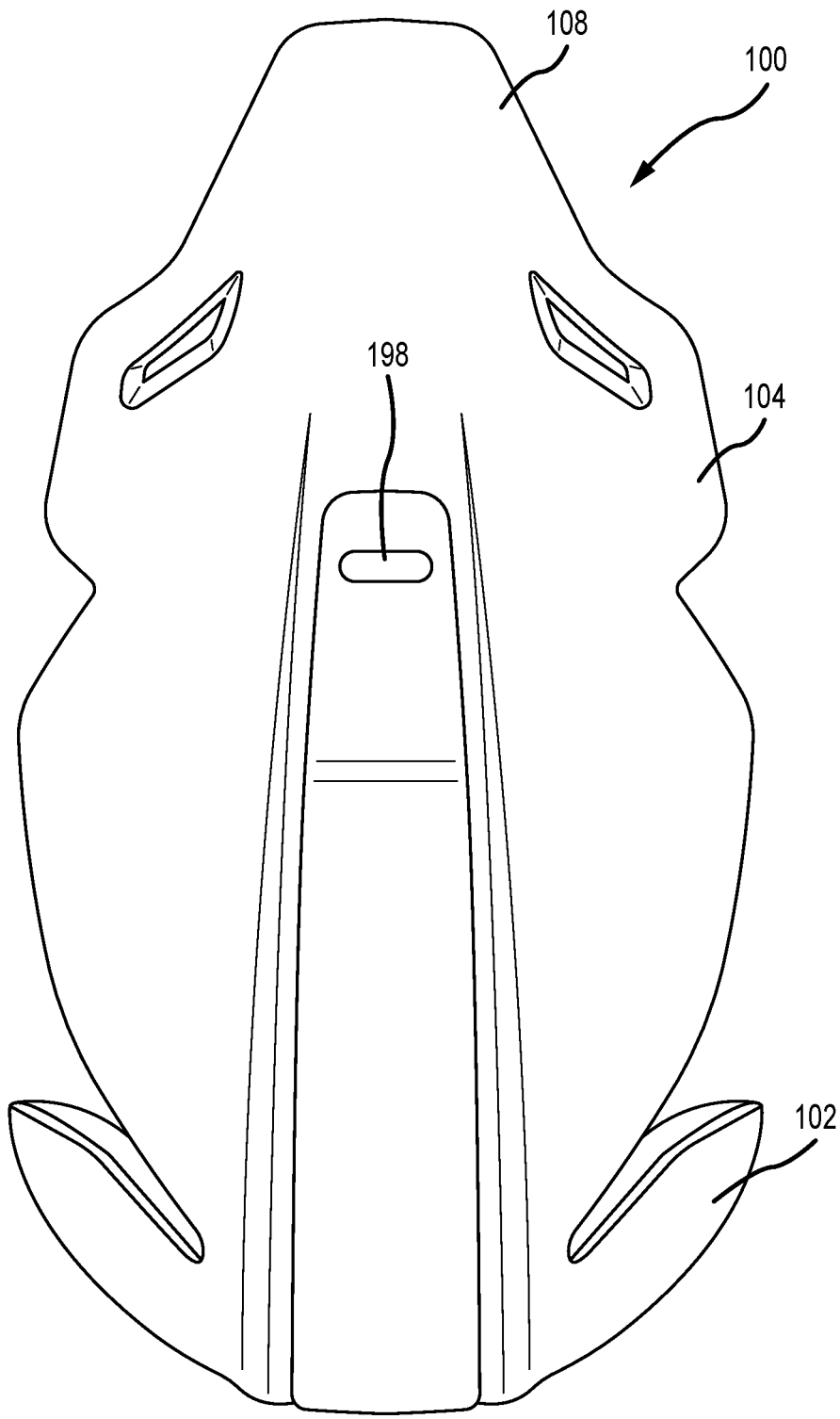
FIG. 4 is a rear view of a vehicle seat, in accordance with the present disclosure.

With reference to FIG. 4, seat back 104 of seat 100 can further comprise an outlet vent 198 (i.e., an air outlet). For example, outlet vent 198 can be fluidly coupled to back air conduit 158 and positioned in rear segment 162 of seat back 104, facing towards a rear passenger (i.e., a passenger positioned behind seat 100, or more generally, positioned more toward the rear of a vehicle comprising seat 100 than seat 100 itself). In such configurations, air passes through back air conduit 158 and exits through outlet vent 198. In various embodiments, outlet vent 198 can be positioned at a vertical position along seat back 104 that corresponds roughly with the vertical location of a head or torso of a passenger. For example, outlet vent 198 can be configured to provide ventilation (including air conditioning and/or heat) to a rear passenger by blowing the air towards them when seated in rear seat of a vehicle. Further, outlet vent 198 can be positioned above a water wading line, which can prevent and/or reduce water from entering the ventilation system through outlet vent 198. Further, while illustrated in FIG. 4 as comprising a single outlet vent 198, seat 100 is not limited in this regard and may comprise multiple outlet vents in arranged in any suitable manner.

Figure 7:
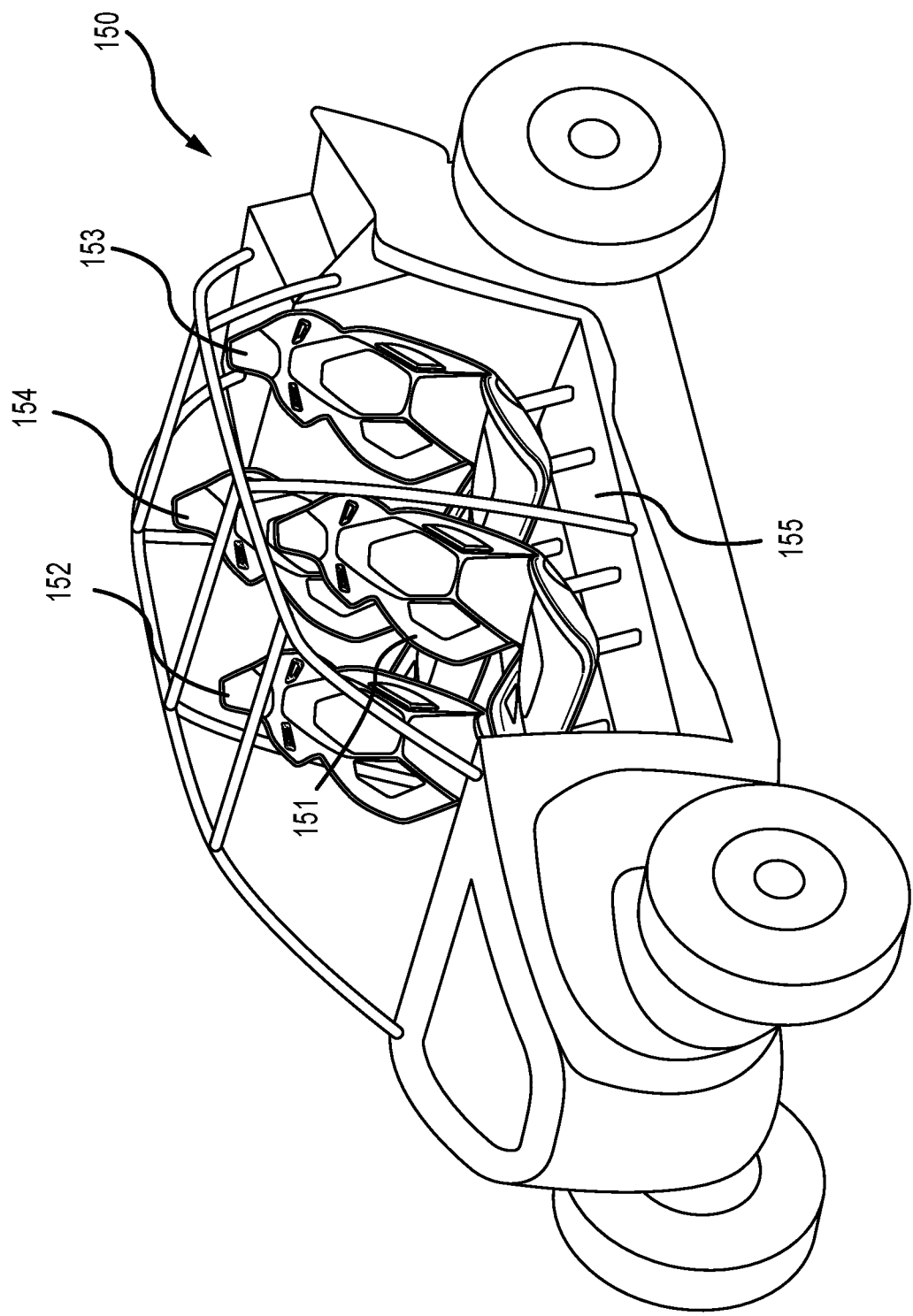
FIG. 7 is a perspective view of an automobile including a front seat and a rear seat, in accordance with the present disclosure.
Figure 8:
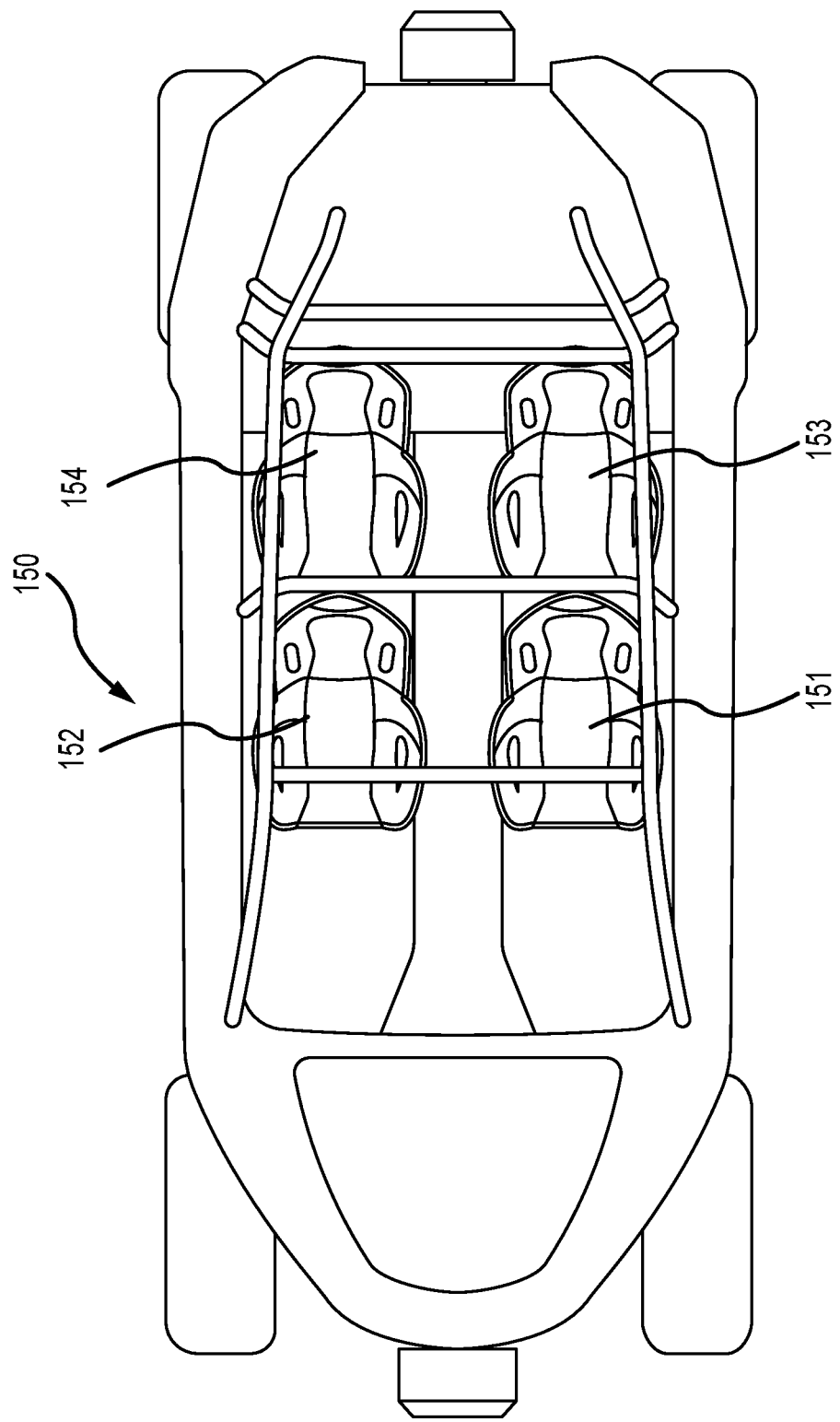
FIG. 8 is a top view of an automobile including a front seat and a rear seat, in accordance with the present disclosure.

With reference to FIGS. 7 and 8, an off-road vehicle 150 in accordance with the present disclosure is illustrated.

Vehicle 150 can, for example, comprise an off-road vehicle, such as a utility task vehicle (UTV). In various embodiments, vehicle 150 comprises a front seat 151 (such as a seat configured similar or the same as a seat 100) positioned as a driver seat and a rear seat 153 positioned behind front seat 151. In such configurations, front seat 151 may provide ventilation from the ventilation system of vehicle 150 to a rear passenger seated in rear seat 153.

Vehicle 150 can further comprise a passenger seat 152 next to front seat 151. In various embodiments, the passenger seat 152 may be configured similarly or the same as seat 100, such that the passenger seat 152 can provide ventilation from the ventilation system of vehicle 150 to a passenger seated behind the passenger seat 152. For example, vehicle 150 can comprise a second rear seat 154 next to rear seat 153 and positioned behind the passenger seat 152, and air can be directed through the passenger seat 152 towards a passenger seated in the second rear seat 154.

In various embodiments, front seat 151 and passenger seat 152, and/or rear seat 153 and second rear seat 154, may be separate from each other (i.e., "bucket" seats). In other embodiments, front seat 151 and passenger seat 152, and/or rear seat 153 and second rear seat 154 may be a single seat (i.e., a "bench" seat). Moreover, a vehicle may utilize any combination of bucket and/or bench seats as disclosed herein. Vehicle 150 may comprise a floor 155 to which front seat 151, passenger seat 152, rear seat 153, and second rear seat 154 may be coupled to.

In this disclosure, reference has been made to the accompanying drawings, which form a part hereof, and in which is shown by way of illustration specific embodiments in which the disclosure may be practiced. It is understood that other embodiments may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate embodiments may be used in any combination desired to form additional hybrid embodiments of the disclosure.

Further, although specific embodiments of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents. Also, as used herein, the terms "coupled," "coupling," or any other variation thereof, are intended to cover a physical connection, an electrical connection, a magnetic connection, an optical connection, a communicative connection, a functional connection, a thermal connection, a chemical connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A vehicle seat comprising:
   a seat base coupled to a seat back,
      wherein the seat base comprises a top segment spaced apart from and coupled to a bottom segment, and wherein the seat back comprises a front segment spaced apart from and coupled to a rear segment;
   a base air conduit positioned within the seat base, wherein a first wall of the base air conduit comprises a portion of an inner surface of one of the top segment and the bottom segment;
   a back air conduit positioned within the seat back, wherein a first wall of the back air conduit comprises a portion of an inner surface of one of the front segment and the rear segment;
   an air outlet fluidly coupled to the back air conduit and positioned in the rear segment of the seat back; and
   an air inlet fluidly coupled to the base air conduit,
      wherein the seat base further comprises two ribs positioned proximate and coupled to the first wall of the base air conduit, and
   wherein the two ribs comprise a second wall and a third wall of the base air conduit.

2. The vehicle seat of claim 1, wherein the air inlet is fluidly coupled to a vehicle air conditioning system.

3. The vehicle seat of claim 1, wherein the back air conduit and the base air conduit are waterproof.

4. The vehicle seat of claim 1, wherein the two ribs of the seat base are coupled to the inner surface of the bottom segment to form a fourth wall of the base air conduit.

5. The vehicle of claim 1, wherein the seat back further comprises two ribs positioned proximate and coupled to the first wall of the back air conduit, and wherein the two ribs comprise a second wall and a third wall of the back air conduit.

6. The vehicle of claim 5, wherein the two ribs of the seat back are coupled to the inner surface of the rear segment to form a fourth wall of the back air conduit.

7. The vehicle seat of claim 1, wherein the front segment and the rear segment of the seat back and the top segment and the bottom segment of the seat base comprise a plastic material.

8. The vehicle seat of claim 1, wherein a cap segment is coupled to the two ribs of the seat base to form a fourth wall of the base air conduit.

9. The vehicle seat of claim 1, wherein the air outlet of the seat back is positioned such that air flowing through the air outlet will be directed toward a head of a rear passenger.

10. A vehicle seat comprising:
    a seat base coupled to a seat back, wherein the seat base comprises a top segment spaced apart from and coupled to a bottom segment, and wherein the seat back comprises a front segment spaced apart from and coupled to a rear segment;

a base air conduit positioned within the seat base, wherein a first wall of the base air conduit comprises an inner surface of the bottom segment, and wherein the base air conduit is substantially waterproof;

a pair of base ribs coupled to the inner surface of the bottom segment of the seat base;

a back air conduit positioned within the seat back, wherein a first wall of the back air conduit comprises a portion of an inner surface of the rear segment, and wherein the back air conduit is substantially waterproof;

a pair of back ribs coupled to the inner surface of the rear segment of the seat back;

a waterproof coupling fluidly coupled to the base air conduit and the back air conduit;

an air outlet fluidly coupled to the back air conduit and positioned in the rear segment of the seat back; and an air inlet fluidly coupled to the base air conduit.

11. The vehicle seat of claim 10, wherein the air inlet is fluidly coupled to a vehicle air conditioning system.

12. The vehicle seat of claim 10, wherein the base air conduit further comprises a fourth wall coupled to the pair of base ribs.

13. The vehicle of claim 12, wherein the pair of base ribs are coupled to an inner surface of the top segment of the seat base forming the fourth wall of the base air conduit.

14. The vehicle seat of claim 10, wherein the back air conduit further comprises a fourth wall coupled to the pair of back ribs.

15. The vehicle seat of claim 14, wherein the pair of back ribs are coupled to an inner surface of the front segment of the seat back forming the fourth wall of the back air conduit.

16. The vehicle seat of claim 10, wherein the front segment and the rear segment of the seat back and the top segment and the bottom segment of the seat base comprise a plastic material.

17. The vehicle seat of claim 10, wherein the air outlet of the seat back is positioned such that air flowing through the air outlet will be directed toward a head of a rear passenger.

* * * * *